United States Patent
Kim et al.

(10) Patent No.: US 11,350,395 B2
(45) Date of Patent: May 31, 2022

(54) METHOD FOR TRANSMITTING OR RECEIVING UPLINK DATA IN WIRELESS COMMUNICATION SYSTEM, AND DEVICE THEREFOR

(71) Applicant: LG ELECTRONICS INC., Seoul (KR)

(72) Inventors: Jaehyung Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 17/045,623

(22) PCT Filed: Apr. 8, 2019

(86) PCT No.: PCT/KR2019/004148
§ 371 (c)(1),
(2) Date: Oct. 6, 2020

(87) PCT Pub. No.: WO2019/194667
PCT Pub. Date: Oct. 10, 2019

(65) Prior Publication Data
US 2021/0160856 A1      May 27, 2021

(30) Foreign Application Priority Data
Apr. 6, 2018   (KR) .................. 10-2018-0040115

(51) Int. Cl.
*H04W 72/04*   (2009.01)
*H04L 27/26*   (2006.01)

(52) U.S. Cl.
CPC ..... *H04W 72/0413* (2013.01); *H04L 27/2601* (2013.01)

(58) Field of Classification Search
CPC .................. H04W 72/0413; H04L 27/2601
(Continued)

(56) References Cited
U.S. PATENT DOCUMENTS

| | | | |
|---|---|---|---|
| 2007/0115795 A1* | 5/2007 | Gore .................. | H04B 1/00 370/203 |
| 2007/0223440 A1* | 9/2007 | Ho ...................... | H04L 5/00 370/342 |

(Continued)

OTHER PUBLICATIONS

Ericsson, "On UE Behavior for UCI Reporting and Other Issues," R1-1800947, 3GPP TSG RAN WG1 Meeting AH 1801, Vancouver, Canada, dated Jan. 22-26, 2018, 20 pages.

(Continued)

*Primary Examiner* — Chi Tang P Cheng
(74) *Attorney, Agent, or Firm* — Fish & Richardson P.C.

(57) ABSTRACT

The present disclosure provides a method for transmitting a physical uplink control channel (PUCCH) in a wireless communication system. Specifically, a UE maps a first sequence of first uplink control information (UCI) and a second sequence of second UCI to at least one OFDM symbol of the PUCCH, and transmits the first UCI and the second UCI to a base station through the PUCCH. In this case, the first sequence is sequentially mapped up to a symbol before a last symbol of the at least one OFDM symbol on a frequency axis and mapped at regular intervals of two or more REs (resource elements) in the last symbol. Also, the second sequence is sequentially mapped on the frequency axis between REs of the last symbol to which the first sequence is mapped.

9 Claims, 10 Drawing Sheets

(58) Field of Classification Search
USPC .......................................................... 370/329
See application file for complete search history.

(56) References Cited

U.S. PATENT DOCUMENTS

2010/0182979 A1* 7/2010 Malladi ............... H04L 27/2613
370/336
2017/0374658 A1 12/2017 Kim et al.
2018/0176059 A1* 6/2018 Medles ............... H04L 27/2613

OTHER PUBLICATIONS

LG Electronics, "Remaining issues on PUCCH resource allocation," R1-1800378, 3GPP TSG RAN WG1 Meeting AH 1801, Vancouver, Canada, dated Jan. 22-26, 2018, 15 pages.
PCT International Search Report in International Application No. PCT/KR2019/004148, dated Aug. 1, 2019, 7 pages (with English translation).
Samsung, "Corrections on PUCCH for up to 2 Symbols," R1-1800447, 3GPP TSG RAN WG1 Meeting AH 1801, Vancouver, Canada, dated Jan. 22-26, 2018, 4 pages.
Vivo, "Remaining issues on Short-PUCCH for UCI of more than 2 bits," R1-1719786, 3GPP TSG RAN WG1 Meeting 91, Reno, USA, dated Nov. 27-Dec. 1, 2017, 5 pages.

* cited by examiner

[FIG. 1]
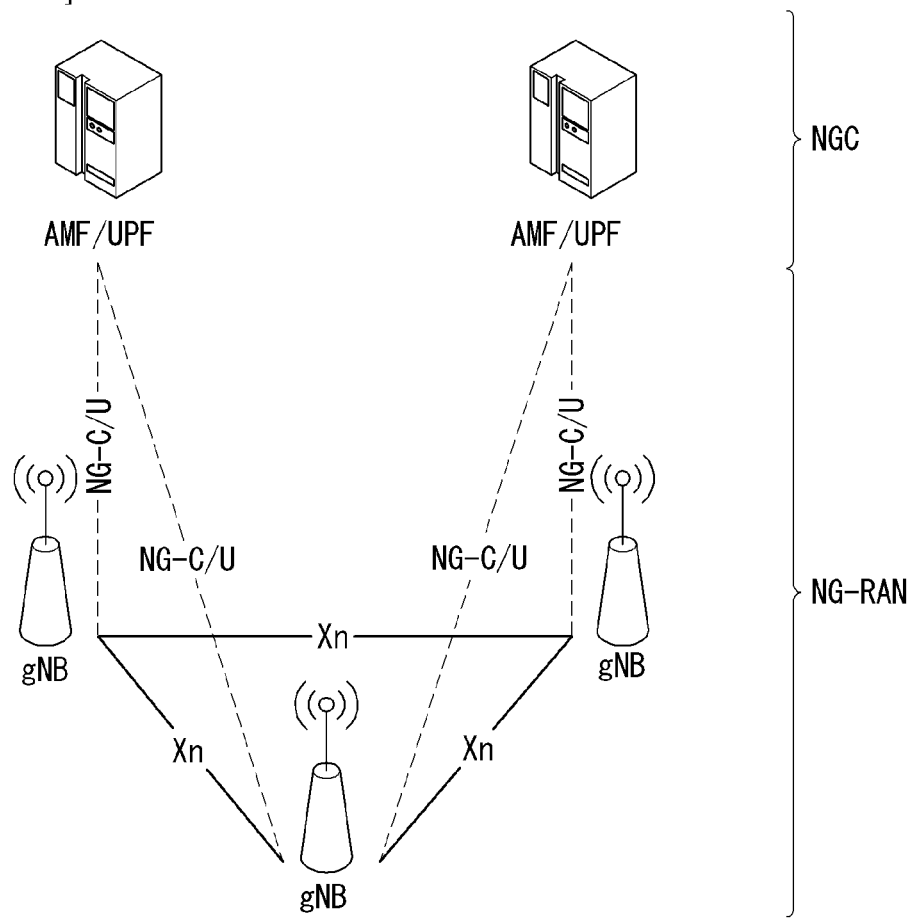
[FIG. 2]
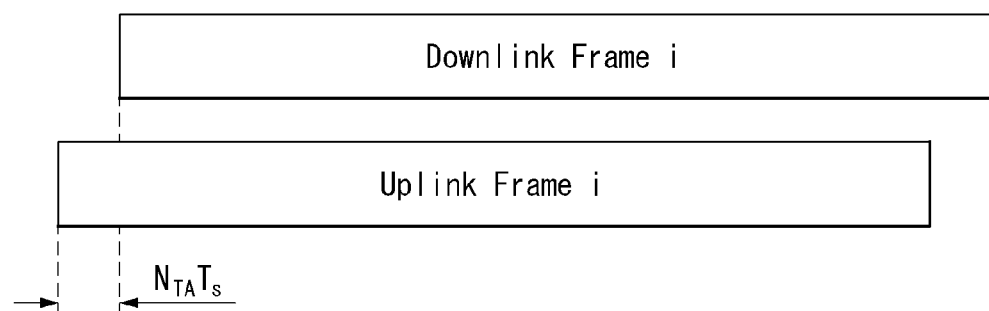

[FIG. 3]
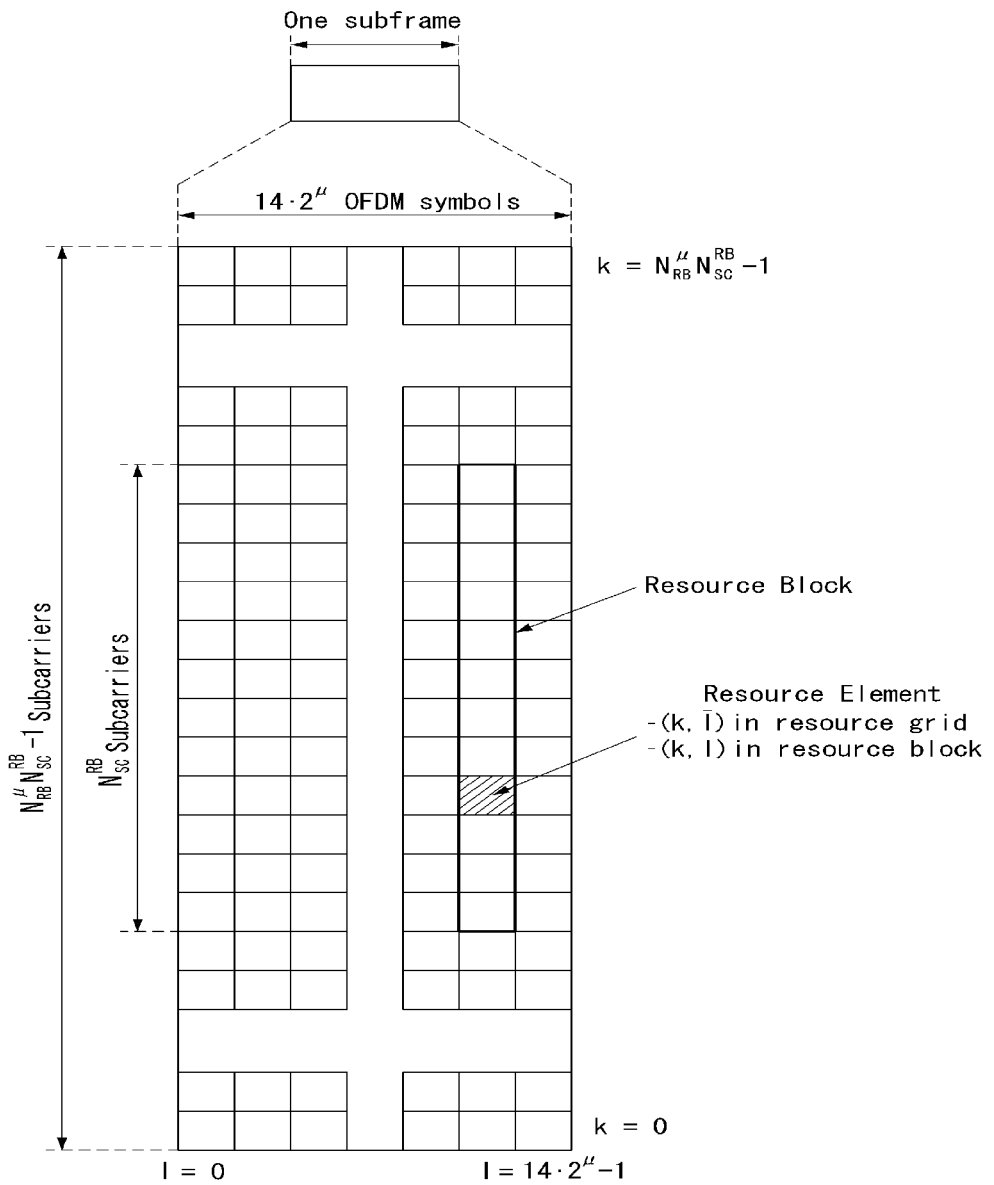

[FIG. 4]
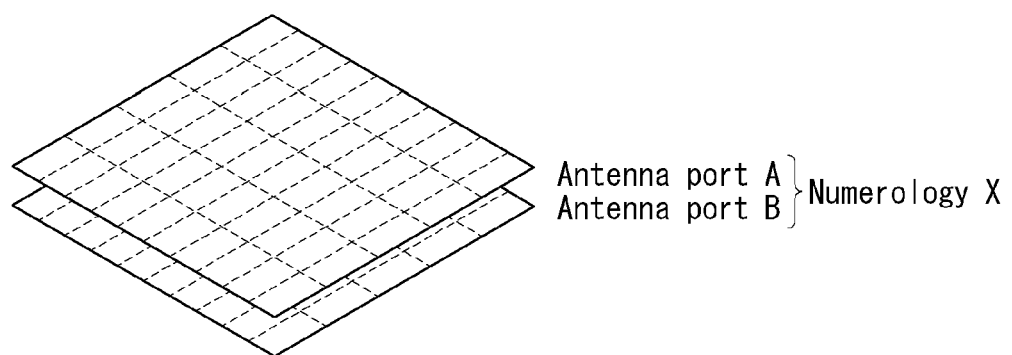
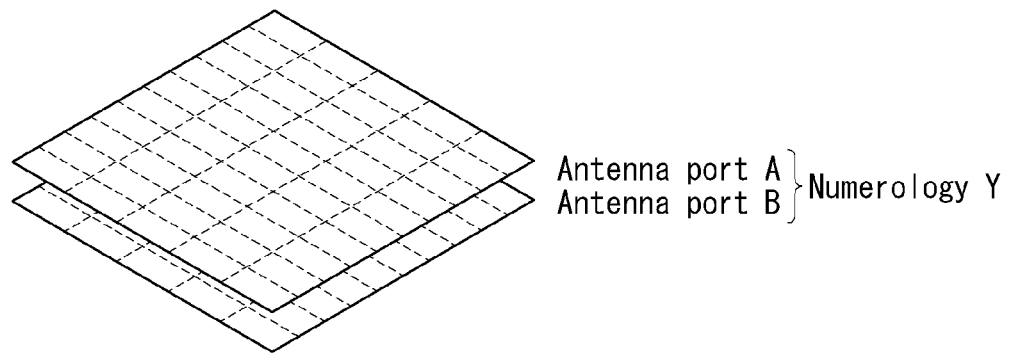

[FIG. 5]
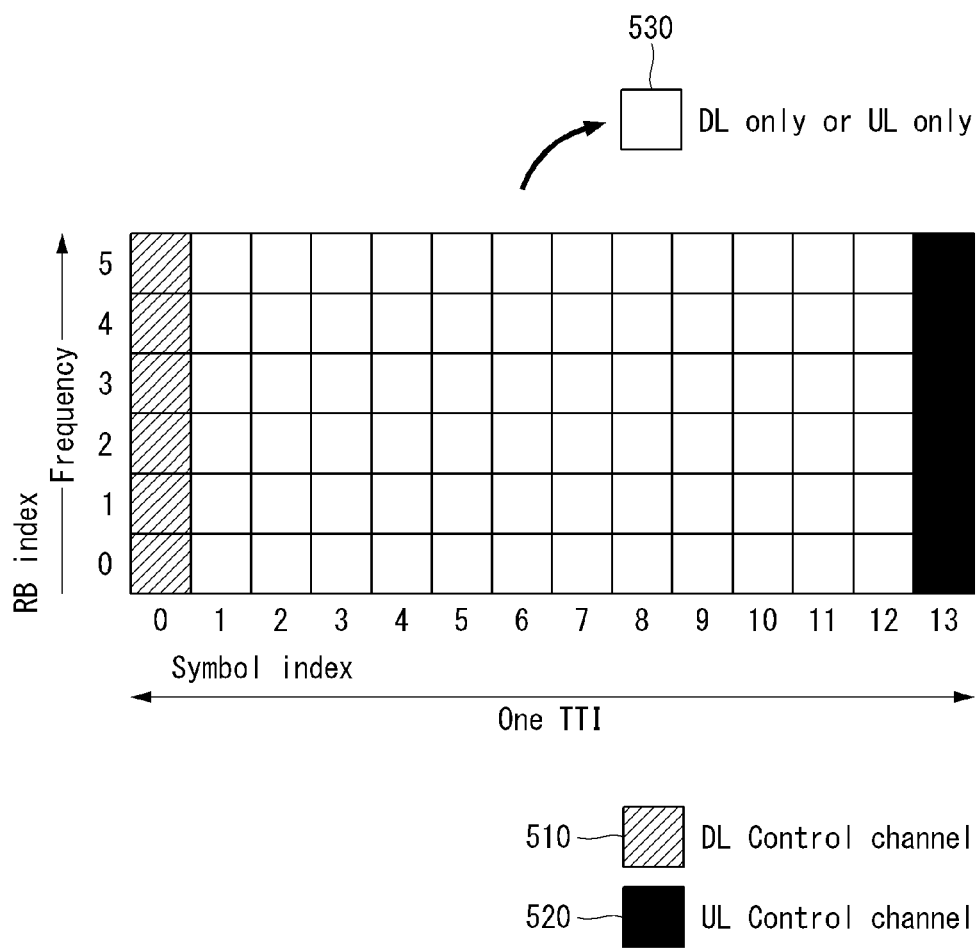

[FIG. 6]
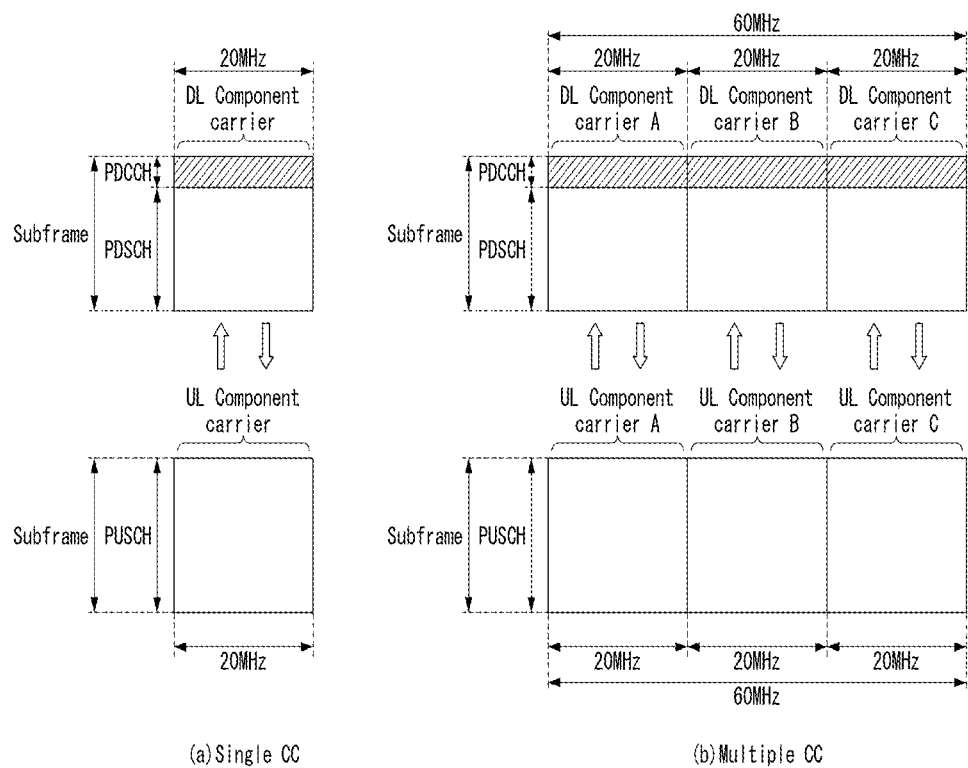

[FIG. 7]
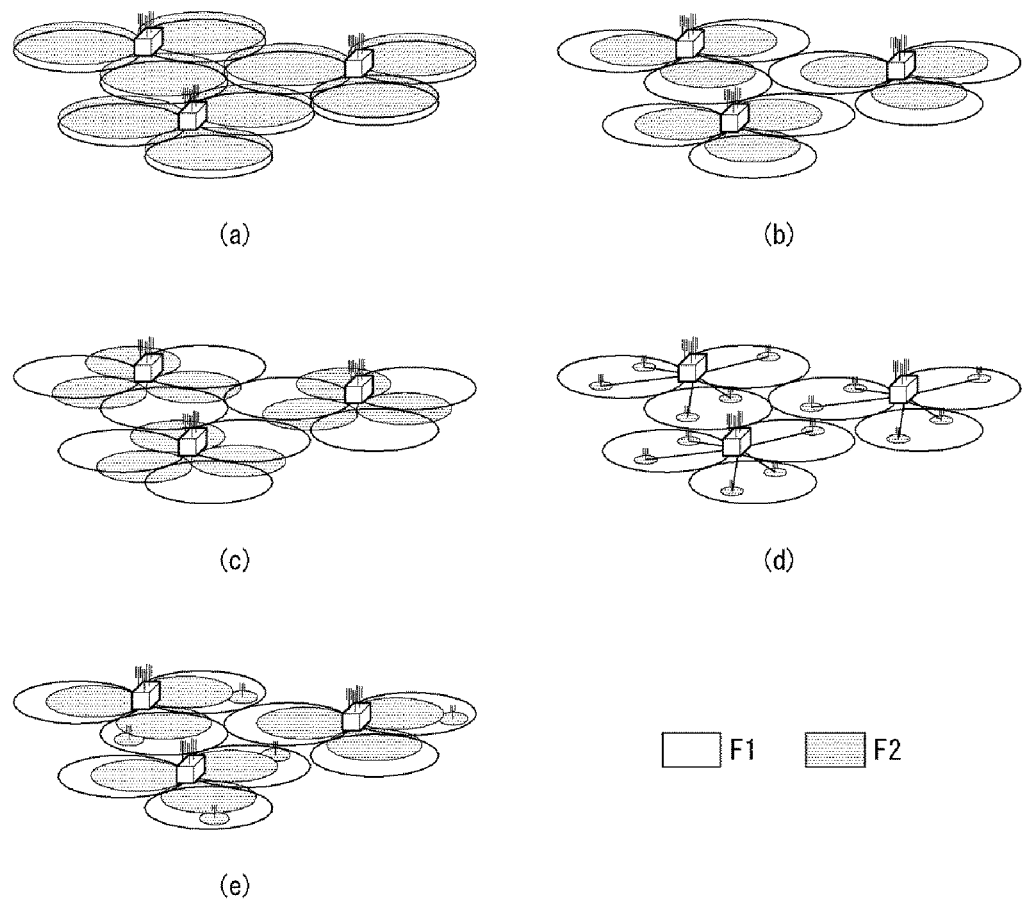

[FIG. 8]
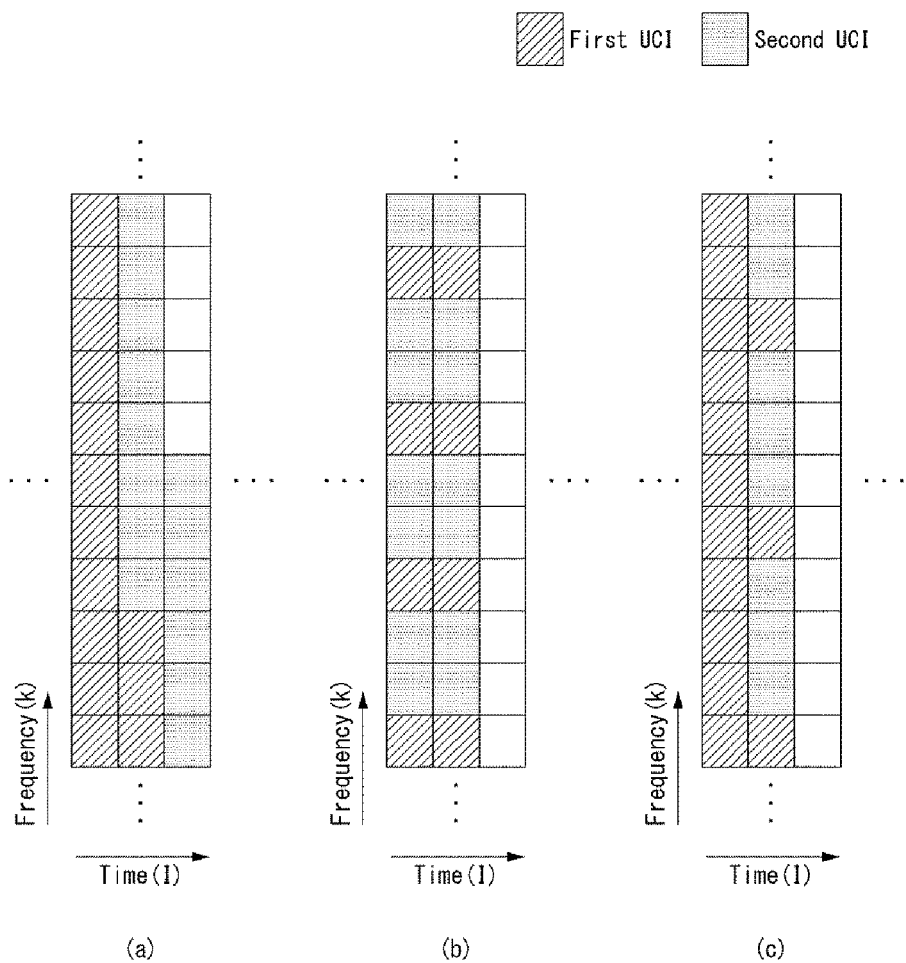

[FIG. 9]
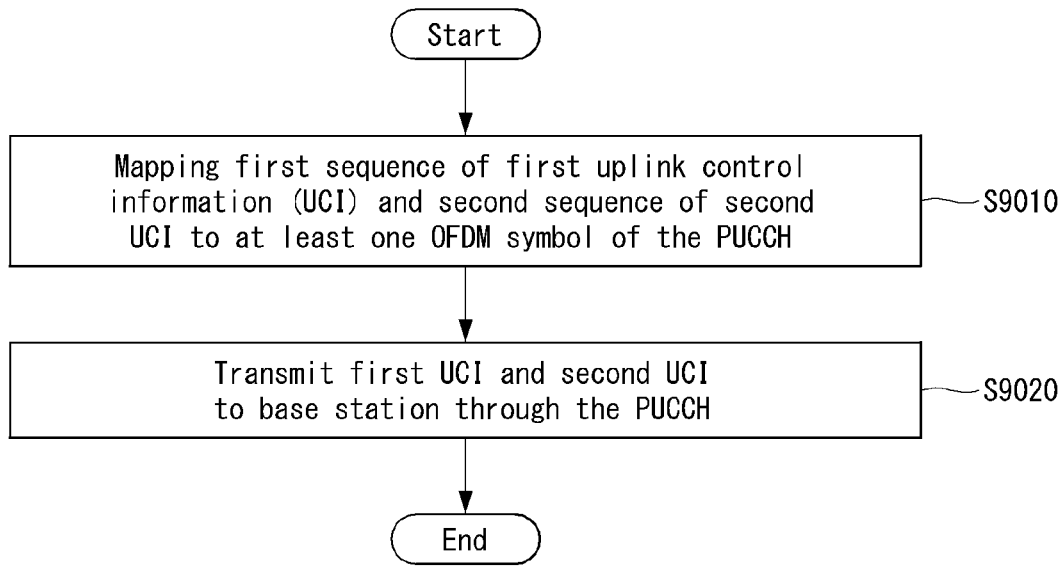
[FIG. 10]
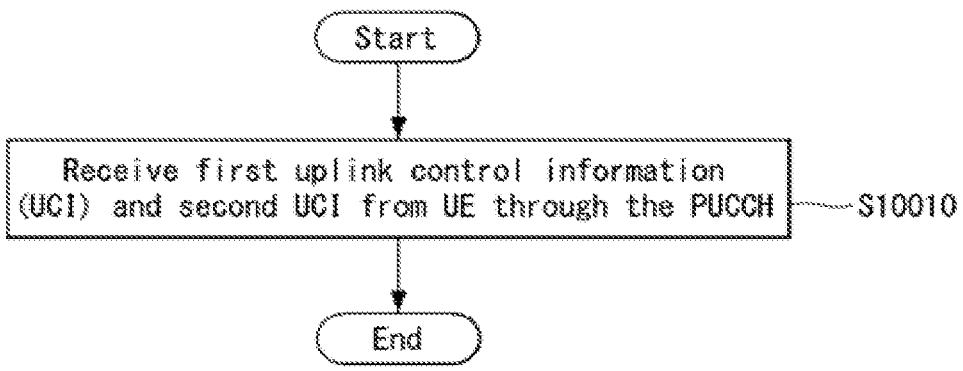

[FIG. 11]
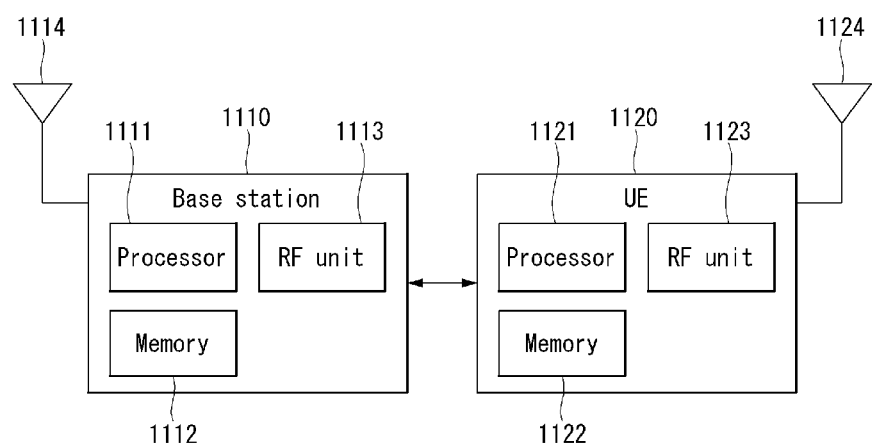

[FIG. 12]
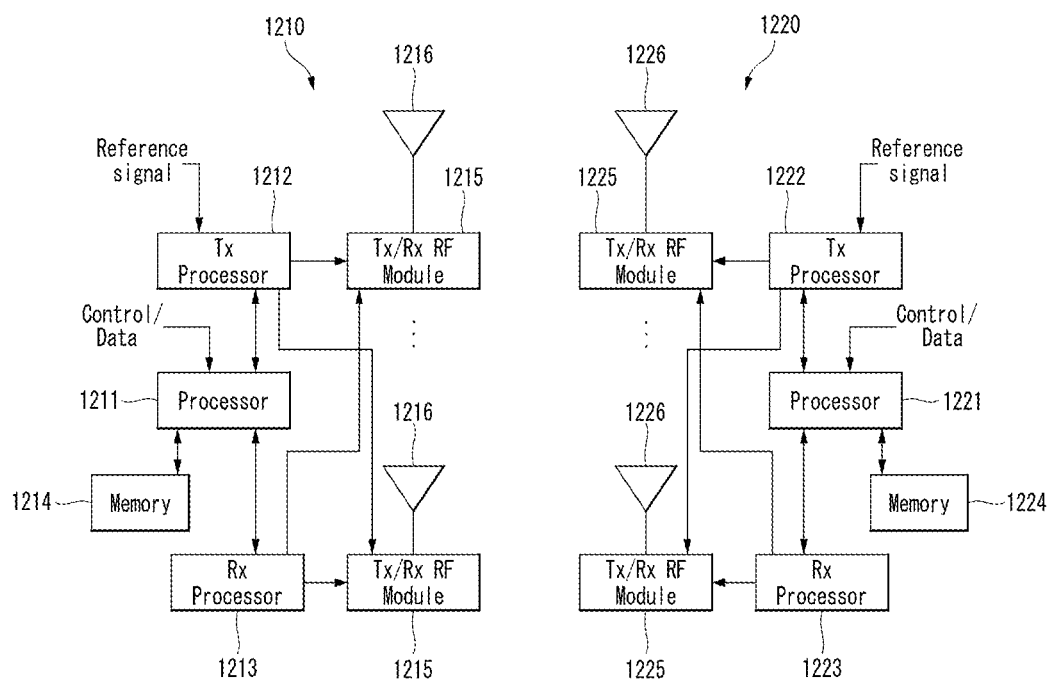

METHOD FOR TRANSMITTING OR RECEIVING UPLINK DATA IN WIRELESS COMMUNICATION SYSTEM, AND DEVICE THEREFOR

CROSS-REFERENCE TO RELATED APPLICATION

This application is a National Stage application under 35 U.S.C. 371 of International Application No. PCT/KR2019/004148, filed on Apr. 8, 2019, which claims the benefit of KR Application No. KR10-2018-0040115, filed on Apr. 6, 2018, the contents of which are all hereby incorporated by reference herein in their entirety.

TECHNICAL FIELD

The present disclosure relates to a wireless communication system and, more particularly, to a method for transmitting and receiving uplink data on a PUCCH or PUSCH and a device supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

An aspect of the present disclosure is to provide a method for transmitting an uplink signal on a PUCCH or PUSCH.

Another aspect of the present disclosure is to provide a method for mapping resource elements for transmitting, to a PUCCH, two types of uplink control information encoded independently by FEC (forward error correction).

Technical problems to be solved by the present disclosure are not limited by the above-mentioned technical problems, and other technical problems which are not mentioned above can be clearly understood from the following description by those skilled in the art to which the present disclosure pertains.

Technical Solution

One exemplary embodiment of the present disclosure provides a method for a UE to transmit an uplink signal in a wireless communication system, the method comprising: mapping a first sequence of first uplink control information (UCI) and a second sequence of second UCI to at least one OFDM symbol of the PUCCH; and transmitting the first UCI and the second UCI to a base station through the PUCCH, wherein the first sequence is sequentially mapped up to a symbol before a last symbol of the at least one OFDM symbol on a frequency axis and mapped at regular intervals of two or more REs (resource elements) in the last symbol, and the second sequence is sequentially mapped on the frequency axis between REs of the last symbol to which the first sequence is mapped.

Furthermore, in the present disclosure, a length of the first sequence may be larger than the number of REs of one OFDM symbol, wherein the length of the first sequence mapped to the last symbol may be equal to or smaller than half the number of REs of the last OFDM symbol.

Furthermore, in the present disclosure, the length of the first sequence may be larger than a length of the second sequence, and the length of the second sequence may be equal to or smaller than half the number of REs of the last OFDM symbol.

Furthermore, in the present disclosure, the first UCI and the second UCI may be encoded by independent encoding methods.

Furthermore, in the present disclosure, the first UCI may be constructed by joint encoding and modulating of at least one among HARQ-ACK, SR (scheduling request), and/or CSI (channel state information) part 1, and the second UCI may be constructed by individually encoding and demodulating CSI part 2.

Furthermore, in the present disclosure, the PUCCH over which the first UCI and the second UCI are mapped and transmitted may be a large payload short PUCCH consisting of 1 symbol or 2 symbols.

Furthermore, in the present disclosure, when the PUCCH is transmitted through frequency hopping, the first UCI and the second UCI may be split into as many parts as the number of frequency hops the PUCCH takes and mapped on each of the frequency hops.

Another exemplary embodiment of the present disclosure provides a method for a base station to receive a physical uplink control channel (PUCCH) in a wireless communication system, the method comprising receiving first UCI (uplink control information) and second UCI from a UE through the PUCCH, wherein a first sequence of the first UCI and a second sequence of the second UCI are mapped to at least one OFDM symbol of the PUCCH, wherein the first sequence is sequentially mapped up to a symbol before a last symbol of the at least one OFDM symbol on a frequency axis and mapped at regular intervals of two or more REs (resource elements) in the last symbol, and the second sequence is sequentially mapped on the frequency axis between REs of the last symbol to which the first sequence is mapped.

Another exemplary embodiment of the present disclosure provides a UE for transmitting a physical uplink control channel (PUCCH) in a wireless communication system, the UE comprising: an RF (radio frequency) module for transmitting and receiving a radio signal; and a processor functionally connected to the RF module, wherein the processor maps a first sequence of first uplink control information (UCI) and a second sequence of second UCI to at least one OFDM symbol of the PUCCH and transmits the first UCI and the second UCI to a base station through the PUCCH, wherein the first sequence is sequentially mapped up to a symbol before a last symbol of the at least one OFDM symbol on a frequency axis and mapped at regular intervals of two or more REs (resource elements) in the last symbol, and the second sequence is sequentially mapped on the frequency axis between REs of the last symbol to which the first sequence is mapped.

Advantageous Effects

The present disclosure has the advantage of efficiently transmitting an uplink signal by defining a method for transmitting an uplink signal on a PUCCH or PUSCH.

Another advantage of the present disclosure is that latency can be reduced by sequentially mapping, on a frequency axis, two types of uplink control information encoded independently by FEC (forward error correction).

Yet another advantage of the present disclosure is that frequency diversity gain can be achieved by equally distributing and mapping, on the frequency axis, two types of uplink control information encoded independently by FEC (forward error correction).

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a view illustrating an example overall NR system structure to which a method as proposed in the disclosure may apply.

FIG. 2 illustrates the relationship between an uplink frame and downlink frame in a wireless communication system to which a method as proposed in the disclosure may apply.

FIG. 3 illustrates an example resource grid supported in a wireless communication system to which a method as proposed in the disclosure may apply.

FIG. 4 illustrates examples of antenna ports and a resource grid for each numerology to which a method proposed in the present disclosure may be applied.

FIG. 5 is a diagram illustrating an example of a self-contained slot structure to which a method proposed in the present disclosure may be applied.

FIG. 6 illustrates an example of a component carrier and a carrier aggregation in a wireless communication system to which a method proposed in the present disclosure may be applied.

FIG. 7 illustrates examples of deployment scenarios in which a carrier aggregation in an NR system is taken into consideration.

FIG. 8 is a view showing an example of a method for mapping uplink control information to an OFDM (orthogonal frequency division multiplexing) symbol, as proposed in the present disclosure.

FIG. 9 is a sequential diagram showing an example of a method of operation of a UE that performs a method proposed in the present disclosure.

FIG. 10 is a sequential diagram showing an example of a method of operation of a base station that performs a method proposed in the present disclosure.

FIG. 11 illustrates a block diagram of a wireless communication device to which methods proposed in the present disclosure are applicable.

FIG. 12 is another illustration of a block diagram of a wireless communication device to which methods proposed in the present disclosure are applicable.

MODE FOR DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

In the disclosure, "base station" means a network terminal node to directly communicate with a user equipment (UE). In the disclosure, a particular operation described to be performed by a base station may be performed by an upper node of the base station in some cases. In other words, in a network constituted of multiple network nodes including the base station, various operations performed to communicate with a UE may be performed by the base station or other network nodes than the base station. "Base station (BS)" may be interchangeably used with the term "fixed station," "Node B," "eNB (evolved-NodeB)," "BTS (base transceiver system)," "AP (Access Point)," or "gNB (next generation NB, general NB, gNodeB)". "Terminal" may refer to a stationary or mobile device and may be interchangeably used with the term "UE (User Equipment)," "MS (Mobile Station)," "UT (user terminal)," "MSS (Mobile Subscriber Station)," "SS (Subscriber Station)," "AMS (Advanced Mobile Station)," "WT (Wireless terminal)," "MTC (Machine-Type Communication) device," "M2M (Machine-to-Machine) device," or "D2D (Device-to-Device) device."

Hereinafter, downlink (DL) means communication from a base station to a terminal, and uplink (UL) means communication between a terminal to a base station. For downlink, a transmitter may be part of a base station, and a receiver may be part of a terminal. For uplink, a transmitter may be part of a terminal, and a receiver may be part of a base station.

The terminology used herein is provided for a better understanding of the disclosure, and changes may be made thereto without departing from the technical spirit of the disclosure.

The following technology may be used in various radio access systems, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). CDMA may be implemented as radio technology, such as universal terrestrial radio access (UTRA) or CDMA2000. TDMA may be implemented as GSM (global system for mobile communications)/GPRS (general packet radio service)/EDGE (enhanced data rates for GSM evolution). OFDMA may be implemented as radio technology, such as IEEE 802.11 (Wi-Fi), IEEE 802.16 (WiMAX), IEEE 802-20, or E-UTRA (evolved UTRA). UTRA is part of UMTS (universal mobile telecommunications system). 3GPP (3rd generation partnership project) LTE (long term evolution) is part of E-UMTS (evolved UMTS) using E-UTRA and adopts OFDMA for downlink and SC-FDMA for uplink. LTE-A (advanced) is an evolution of 3GPP LTE.

5G NR defines enhanced mobile broadband (eMBB), massive machine type communications (mMTC), ultra-reliable and low latency communications (URLLC), and vehicle-to-everything (V2X) depending on usage scenarios.

The 5G NR standards are divided into standalone (SA) and non-standalone (NSA) depending on co-existence between the NR system and the LTE system.

5NR supports various subcarrier spacings and supports CP-OFDM on downlink and CP-OFDM and DFT-s-OFDM (SC-OFDM) on uplink.

Embodiments of the disclosure may be supported by the standard documents disclosed in IEEE 802, 3GPP, and 3GPP2 which are radio access systems. In other words, in the embodiments of the disclosure, steps or parts skipped from description to clearly disclose the technical spirit of the disclosure may be supported by the documents. All the terms disclosed herein may be described by the standard documents.

Although the description focuses primarily on 3GPP LTE/LTE-A/NR (New RAT) for clarity, the technical features of the disclosure are not limited thereto.

Terminology eLTE eNB: eLTE eNB is an evolution of eNB supporting connectivity to EPC and NGC.

gNB: A node supporting NR as well as connectivity with NGC.

New RAN: A radio access network interacting with NGC or supporting NR or E-UTRA.

Network slice: A network defined by the operator to provide the optimized solution on a specific market scenario with a specific requirement along with an end-to-end range.

Network function: A logical node in a network infrastructure with a well-defined functional operation and external interface.

NG-C: A control plane interface used at an NG2 reference point between new RAN and NGC.

NG-U: A user plane interface used at an NG3 reference point between new RAN and NGC.

Non-standalone NR: An arrangement in which gNB requires LTE eNB as an anchor for control plane connection to EPC or eLTE eNB as an anchor for control plane connection to NGC.

Non-standalone E-UTRA: An arrangement in which eLTE eNB requires gNB as an anchor for control plane connection to NGC.

User plane gateway: An end point of NG-U interface.

Numerology: this corresponds to one subcarrier spacing in the frequency domain. A different numerology may be defined by scaling a reference subcarrier spacing using an integer N.

NR: NR Radio Access or New Radio

Overview of System

FIG. 1 is a view illustrating an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In connection with the frame structure in the NR system, the size of various fields in the time domain is expressed as a multiple of time unit $T_s = 1/(\Delta f_{max} \cdot N_f)$. Here, $\Delta f_{max} = 480 \cdot 10^3$, and $N_f = 4096$. A downlink and uplink transmission is constituted of a radio frame with a period of $T_f = (\Delta f_{max} N_f/100) \cdot T_s = 10$ ms. Here, the radio frame is constituted of 10 subframes each of which has a period of $T_{sf} = (\Delta f_{max} N_f/1000) \cdot T_s = 1$ ms. In this case, one set of frames for uplink and one set of frames for downlink may exist.

FIG. 2 illustrates the relationship between an uplink frame and downlink frame in a wireless communication system to which a method as proposed in the disclosure may apply.

As shown in FIG. 2, transmission of uplink frame number i from the user equipment (UE) should begin $T_{TA} = N_{TA} T_s$ earlier than the start of the downlink frame by the UE.

For numerology μ, slots are numbered in ascending order of $n_s^\mu \in \{0, \ldots, N_{subframe}^{slots, \mu} - 1\}$ in the subframe and in ascending order of $n_{s,f}^\mu \in \{0, \ldots, N_{frame}^{slots, \mu} - 1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

All UEs are not simultaneously capable of transmission and reception, and this means that all OFDM symbols of the downlink slot or uplink slot may not be used.

Table 2 illustrates the number of OFDM symbols per slot for a normal CP in the numerology μ. Table 3 illustrates the number of OFDM symbols per slot for an extended CP in the numerology μ.

TABLE 2

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

In connection with the physical resource in the NR system, antenna port, resource grid, resource element, resource block, and carrier part may be taken into consideration.

Hereinafter, the physical resources that may be considered in the NR system are described in detail.

First, in connection with antenna port, the antenna port is defined so that the channel carrying a symbol on the antenna port may be inferred from the channel carrying another symbol on the same antenna port. Where the large-scale property of the channel carrying a symbol on one antenna port may be inferred from the channel carrying a symbol on a different antenna port, the two antenna ports may be said to have a QC/QCL (quasi co-located or quasi co-location) relationship. Here, the large-scale properties include one or more of delay spread, Doppler spread, frequency shift, average received power, and received timing.

FIG. 4 illustrates an example resource grid supported in a wireless communication system to which a method as proposed in the disclosure may apply.

Referring to FIG. 4, although an example is described in which the resource grid is constituted of $N_{RS}^{\mu}N_{sc}^{RB}$ subcarriers in the frequency domain, and one subframe includes 14·2µ OFDM symbols, embodiments of the disclosure are not limited thereto.

In the NR system, the transmitted signal is described with one or more resource grids constituted of $N_{RS}^{\mu}N_{sc}^{RB}$ subcarriers and $2^{\mu}N_{symb}^{(\mu)}$ OFDM symbols. Here, $N_{RS}^{\mu} \le N_{RB}^{max,\mu}$. $N_{RS}^{max,\mu}$ refers to the maximum transmission bandwidth, and this may be varied between uplink and downlink as well as numerologies.

In this case, as shown in FIG. 4, one resource grid may be configured per numerology µ and antenna port p.

FIG. 5 illustrates examples of per-antenna port and numerology resource grids to which a method as proposed in the disclosure may apply.

Each element of the resource grid for numerology µ and antenna port p is denoted a resource element and is uniquely identified by index pair (k,l). Here, k=0, . . . , $N_{RB}^{\mu}N_{sc}^{RB}-1$ is the index in the frequency domain, and l=0, . . . , $2^{\mu}N_{symb}^{(\mu)}-1$ denotes the position of symbol in the subframe. Upon denoting the resource element in slot, index pair (k,l) is used. Here, l=0, . . . , $N_{symb}^{\mu}-1$.

For numerology and antenna port, resource element (k,l) corresponds to complex value $a_{k,l}^{(p,\mu)}$. Where there is no risk of confusion or where a specific antenna port or numerology is not specified, indexes p and µ may be dropped and, as a result, the complex value may become $a_{k,l}^{(p)}$ or $a_{k,l}$.

The physical resource block is defined with $N_{sc}^{RB}=12$ consecutive subcarriers in the frequency domain.

Physical resource blocks are numbered from 0 to $N_{RB}^{\mu}-1$ on the frequency domain. In this case, a relation between a physical resource block number $n_{PRB}$ and resource elements (k,l) on the frequency domain is given like Equation 1.

$$n_{PRB} = \left\lfloor \frac{k}{N_{sc}^{RB}} \right\rfloor \quad \text{[Equation 1]}$$

Furthermore, in relation to a carrier part, a UE may be configured to perform reception or transmission using only a subset of resource grids. In this case, a set of resource blocks configured to be received or transmitted by the UE is numbered from 0 to $N_{URB}^{\mu}-1$ on the frequency domain.

Self-Contained Slot Structure

In a TDD system, in order to minimize latency of data transmission, a self-contained slot structure, such as FIG. 5, is considered in a 5G New RAT (NR).

That is, FIG. 5 is a diagram illustrating an example of a self-contained slot structure to which a method proposed in the present disclosure may be applied.

In FIG. 5, a slashed area 510 indicates a downlink control region, and a dark portion 520 indicates an uplink control region.

A portion 530 not including any indication may be used for downlink data transmission or may be used for uplink data transmission.

In the characteristics of such a structure, DL transmission and UL transmission may be sequentially performed within one slot, and DL data may be transmitted and UL Ack/Nack may be transmitted and received within one slot.

Such a slot may be defined as a "self-contained slot."

That is, through such a slot structure, a BS can reduce the time taken for data retransmission to a UE when a data transmission error occurs, and thus can minimize latency of the final data transmission.

In such a self-contained slot structure, a BS and a UE require a time gap for a process of switching from a transmission mode to a reception mode or a process of switching from the reception mode to the transmission mode.

To this end, in the corresponding slot structure, some OFDM symbols at timing at which DL switches to UL may be configured as a guard period (GP).

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 6 illustrates examples of a component carrier and carrier aggregation in the wireless communication system to which the present invention can be applied.

FIG. 6a illustrates a single carrier structure used in an LTE system. The component carrier includes the DL CC and the UL CC. One component carrier may have a frequency range of 20 MHz.

FIG. 6b illustrates a carrier aggregation structure used in the LTE system. In the case of FIG. 6b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (MM) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

If a UE is configured with one or more S cells, a network may activate or deactivate the configured S cell(s). A P cell is always activated. The network activates or deactivates the S cell(s) by transmitting an activation/deactivation MAC control element.

The activation/deactivation MAC control element has a fixed size, and is configured with a single octet including 7 C-fields and 1 R-field. The C-field is configured for each S cell index (SCellIndex), and indicates the activation/deactivation state of an S cell. When a C-field value is set to "1", it indicates the activation of an S cell having a corresponding S cell index. When the C-field value is set to "0", it indicates the deactivation of an S cell having a corresponding S cell index.

Furthermore, the UE maintains a timer (sCellDeactivationTimer) for each configured S cell, and deactivates a related S cell until the timer expires. The same initial timer value is applied to each instance of the timer (sCellDeactivationTimer), and is set by RRC signaling. When an S cell(s) is added or after handover, an initial S cell(s) is in a deactivated state.

A UE performs the following operation on each configured S cell(s) in each TTI.

When receiving an activation/deactivation MAC control element that activates an S cell in a specific TTI (subframe n), the UE activates the S cell in a TTI (subframe n+8 or thereafter) corresponding to predetermined timing, and (re)starts a timer related to the corresponding S cell. What the UE activates the S cell means that the UE applies a normal S cell operation, such as sounding reference signal (SRS) transmission on the S cell, a channel quality indicator (CQI)/precoding matrix indicator (PMI)/rank indication (RI)/precoding type indicator (PTI) report for the S cell, PDCCH monitoring on the S cell, and PDCCH monitoring for the S cell.

When the UE receives an activation/deactivation MAC control element that deactivates an S cell in a specific TTI (subframe n) or a timer related to a specific TTI (subframe n) activated S cell expires, the UE deactivates the S cell in a TTI (subframe n+8 or thereafter) corresponding to predetermined timing, stops the timer of the corresponding S cell, and flushes the entire HARQ buffer related to the corresponding S cell.

When a PDCCH on an activated S cell indicates an uplink grant or a downlink assignment or a PDCCH on a serving cell that schedules an activated S cell indicates an uplink grant or downlink assignment for the activated S cell, the UE restarts a timer related to the corresponding S cell.

When an S cell is deactivated, the UE does not transmit an SRS on the S cell, does not report a CQI/PMI/RI/PTI for the S cell, does not transmit an UL-SCH on the S cell, and does not monitor a PDCCH on the S cell.

The aforementioned contents of the carrier aggregation have been described based on the LTE/LTE-A system, but this is merely for convenience of description and may be similarly extended and applied to the 5G NR system. In particular, carrier aggregation deployment scenarios taken into consideration in the 5G NR system may be the same as those of FIG. 7.

FIG. 7 illustrates examples of deployment scenarios in which a carrier aggregation in an NR system is taken into consideration.

Referring to FIG. 7, F1 and F2 may mean a cell configured with a first frequency (or a first frequency band, a first carrier frequency, or a first center frequency) and a cell configured with a second frequency (or a second frequency band, a second carrier frequency or a second center frequency).

(a) of FIG. 7 illustrates a first CA deployment scenario. As illustrated in (a) of FIG. 7, the F1 cell and the F2 cell may be co-located or overlaid. In this case, both the two layers may provide sufficient coverage, and mobility in the two layers may be supported. The corresponding scenario may include a case where the F1 cell and the F2 cell are present in the same band. In the corresponding scenario, it may be expected that an aggregation between the overlapped F1 cell and F2 cell will be possible.

(b) of FIG. 7 illustrates a second CA deployment scenario. As illustrated in (b) of FIG. 7, the F1 cell and the F2 cell may be co-located, but the F2 cell may support smaller coverage due to a larger path loss. In this case, only the F1 cell provides sufficient coverage, and the F2 cell may be used to improve the throughput. In this case, mobility may be performed based on the coverage of the F1 cell. The corresponding scenario may include a case where the F1 cell and the F2 cell are present in different bands (e.g., the F1 cell is {800 MHz, 2 GHz}, the F2 cell is {3.5 GHz}). In the corresponding scenario, it may be expected that an aggregation between the overlapped F1 cell and F2 cell will be possible.

(c) of FIG. 7 illustrates a third CA deployment scenario. As illustrated in (c) of FIG. 7, the F1 cell and the F2 cell are co-located, but the antenna of the F2 cell may be connected to the boundary of the F2 cell in order to increase the throughput of a cell boundary. In this case, the F1 cell provides sufficient coverage, but the F2 cell may have a hole attributable to a potentially greater path loss. In this case, mobility may be performed based on the coverage of the F1 cell. The corresponding scenario may include a case where the F1 cell and the F2 cell are present in different bands (e.g., the F1 cell is {800 MHz, 2 GHz}, the F2 cell is {3.5 GHz}). In the corresponding scenario, it may be expected that an aggregation between the F1 cell and F2 cell of the same BS (eNB) will be possible in a region where coverages overlap.

(d) of FIG. 7 illustrates a fourth CA deployment scenario. As illustrated in (d) of FIG. 7, the F1 cell provides macro coverage, and F2 remote radio heads (RRHs) may be used for throughput improvements in a hot spot. In this case, mobility may be performed based on coverage of the F1 cell. The corresponding scenario may include both a case where the F1 cell and the F2 cell correspond to a DL non-contiguous carrier in the same band (e.g., 1.7 GHz) and a case where the F1 cell and the F2 cell are present in different bands (e.g., the F1 cell is {800 MHz, 2 GHz}, the F2 cell is {3.5 GHz}). In the corresponding scenario, it may be expected that the F2 cells (i.e., RRHs) may be aggregated with the F1 cell (i.e., a macro cell)(s) connected therewith (underlying).

(e) of FIG. 7 illustrates a fifth CA deployment scenario. The corresponding scenario is similar to the second CA deployment scenario, but frequency selective repeaters may be deployed in order to extend coverage for one of carrier frequencies. In the corresponding scenario, it may be expected that the F1 cell and F2 cell of the same BS may be aggregated in a region where coverages overlap.

A reception timing difference (e.g., dependent on the number of control symbols, propagation and a deployment scenario) in the physical layer of UL grants and DL assignments for the same TTI, although it is based on different serving cells may not be affected by a MAC operation. A UE may need to process a relative propagation delay difference up to 30 us among CCs to be aggregated in both an intra-band non-contiguous CA and an inter-band non-contiguous CS. This may mean that since time alignment of a BS is specified as a maximum of 0.26 us, a UE may need to process delay spread up to 30.26 us among CCs monitored in a receiver. Furthermore, this may mean that a UE has to process a maximum UL transmission timing difference between TAGs of 36.37 us with respect to an inter-band CA having multiple TAGs.

If a CA is deployed, frame timing and a system frame number (SFN) may be arranged in aggregated cells.

The NR system can support a physical uplink control channel (PUCCH) which is a physical channel for transmitting uplink control information (UCI) including HARQ-ACK, a scheduling request (SR), and channel state information (CSI).

The PUCCH may include a small-payload PUCCH supporting small UCI payload (e.g., 1 to 2 bits of UCI) and a large-payload PUCCH supporting large UCI payload (e.g., 2 to several hundred bits of UCI) depending on UCI payload.

The small-payload PUCCH and the large-payload PUCCH each may include a short PUCCH with a short duration (e.g., 1 to 2 symbol durations) and a long PUCCH with a long duration (e.g., 4 to 14 symbol durations).

The long PUCCH may be primarily used to transmit a medium/large UCI payload or to improve the coverage of the small UCI payload.

The PUCCHs may be classified based on transmittable UCI payload size, PUCCH structure (e.g., PUCCH length in symbols), or multiplexing capacity. In addition, the PUCCHs may be defined and supported in a plurality of PUCCH formats.

For example, a PUCCH format may be configured with a small-payload short PUCCH, a small-payload long PUCCH, a large-payload short PUCCH, a large-payload long PUCCH, a medium-payload long PUCCH, etc.

The present disclosure proposes a method for mapping resource elements (REs) to transmit two types of UCI information encoded independently by FEC (forward error correction), over a PUCCH based on orthogonal frequency division multiplexing (OFDM).

The two types of UCI information may differ in requirements such as latency and robustness or may need to be sequentially received due to their dependency.

For example, the first UCI may include information required to receive the second UCI (for example, information such as size, time/frequency position, parity, etc. which is needed or helpful for decoding the second UCI).

If the first UCI is a first part of the channel state information, the base station has to receive the first part to recognize the payload size of the second part of the CSI. Accordingly, if the UCI is CSI, the second part of the CIS has to be received after the reception of the first part of the CSI so that the second part of the CSI can be decoded.

An input of PUCCH RE mapping may be constructed by applying FEC encoding and modulation to the first UCI and the second UCI individually.

Hereinafter, in the present disclosure, modulation symbols generated from the first UCI are referred to as UCI part 1, and modulation symbols generated from the second UCI are referred to as UCI part 2.

Besides FEC encoding and modulation, scrambling and/or interleaving may be additionally applied to generate the UCI part 1 and the UCI part 2.

Hereinafter, in the present disclosure, the OFDM-based PUCCH may refer to a type in which UCI information is mapped to REs and transmitted on the frequency axis.

Moreover, the OFDM-based PUCCH may include a reference signal (for example, PUCCH DMRS) required for a receiving end (e.g., gNB) to perform channel estimation, synchronization, etc. on the frequency axis.

The above-explained large-payload short PUCCH in the NR system may be an example of the OFDM-based PUCCH.

In addition, in the NR system, if the UCI includes a subband CSI report, the payload of the CSI may vary depending on the number of ranks determined by the UE.

In this case, in order to avoid any burden caused by excessive blind detection (BD) at the gNB, the UE may perform FEC encoding separately on the CSI part 1, which is a fixed-size part of the entire information of the UCI, and the CSI part 2, which is a variable-size part thereof, and may have rank information, etc. included in the fixed-size, CSI part 1, which is used for determining the size of the CSI part 1.

In this case, the gNB has to successfully decode the CSI part 1 so as to decode the CSI part 2.

That is, the gNB has to successfully decode the CSI part 1 so as to recognize the payload size of the CSI part 2, and may decode the CSI part 2 by using the recognized payload size of the CSI part 2.

Therefore, it can be said that the CSI part 1 has priority over the CSI part 2 in terms of decoding order and performance.

Due to this reason, when HARQ-ACK (or HART-ACK and SR) information is transmitted simultaneously with a subband CSI report, the HARQ-ACK (or HARQ-ACK and SR) information of higher importance may be encoded and modulated jointly with the CSI part 1 to constitute the UCI part 1.

The CSI part 2 may be separately encoded and modulated to constitute the UCI part 2.

Accordingly, the present disclosure may be applied when the NR system transmits HARQ-ACK (or HARQ ACK and SR) information and a subband CSI report simultaneously through a large-payload short PUCCH.

Hereinafter, the present disclosure provides a method for mapping separately encoded and modulated UCIs to REs of an OFDM symbol.

Method for Separately Encoding and Mapping UCI Parts

Referring to this embodiment, a UE may transmit to a base station a UCI part 1 and a UCI part 2 which are encoded independently by FEC methods, through a large-payload short PUCCH consisting of 1 symbol or 2 symbols.

In this case, the following RE mapping method may be taken into consideration.

Specifically, the basic units of RE mapping are modulation symbols constituting the UCI part 1 and the UCI part 2. An input of RE mapping may be composed of a UCI part 1 modulation symbol sequence (hereinafter, first sequence) and a UCI part 2 modulation symbol sequence (hereinafter, second sequence) which are sequentially outputted through FEC encoding and modulation.

The time/frequency axis indices and parameters for explaining the RE mapping of the PUCCH are as follows.

OFDM symbol indices within the duration of the PUCCH may be denoted by l (l may have a value of $l_0+1, \ldots, l_0+NP-1$)

l is an OFDM symbol index within a slot (or subframe)
  $l_0$ is the first OFDM symbol index within the duration of the PUCCH (or the lowest OFDM symbol index within the duration of the PUCCH)
  NP is the number of OFDM symbols within the duration of the PUCCH Frequency domain indices allocated for PUCCH transmission may be denoted by k (k may have a value of $k_0, k_0+1, \ldots, k_0+NRB*numRE-1$.

k is a frequency index (or sub-carrier/RE index) within a system bandwidth, RF bandwidth, or bandwidth part
  $k_0$ is the lowest (or first) frequency domain index allocated for PUCCH transmission
  NRB is the number of frequency domain RBs allocated for PUCCH transmission
  NumRE is the number of REs constituting a single RB Hereinafter, in the present disclosure, the positions of REs corresponding to the time domain OFDM symbol index l and frequency domain index K are denoted by {l, k}, in order to simply represent the time/frequency positions of the REs in a combination of l and K.

Assuming that an (i+1)th UCI modulation symbol constituting a first sequence is u1(i), the first sequence may be composed of u1(0), u1(1), . . . ,u1(N1-1) or u1(i),(i=0, 1, 2, . . . ,N1-1).

Assuming that an (i+1)th UCI modulation symbol constituting a second sequence is u2(i), the second sequence may be composed of u2(0), u2(1), . . . ,u2(N1-1) or u2(i), (i=0, 1, 2, . . . ,N2-1).

A U sequence may be composed of a concatenation of the first sequence and second sequence. That is, the U sequence u(0), u(1), . . . ,u(N1-1) or u(i) (i=0, 1, 2, . . . ,N−1) may be composed of u1(0), u1(1), . . . ,u1(N1-1), u2(0), u2(1), . . . ,u2(N1-1).

N1 (or N2) is the number of modulation symbols of a UCI part 1 (or UCI part 2) constituting the first sequence (or second sequence)
  N means the sum of the modulation symbols of the UCI part 1 and UCI part 2 (N=N1+N2)
  Assuming that the number of REs available for UCI transmission (i.e., the number of REs to which UCI can be mapped) is NRE, the relationship among N1, N2, N, and NRE may be given by the following Equation 2:

$$N=+N2, NRE \geq N \qquad \text{[Equation 2]}$$

where NRE may be set as the number of RBs, i.e., NRB, that provide more REs than N or as many REs as N.

FIG. 8 is a view showing an example of a method for mapping uplink control information to an OFDM (orthogonal frequency division multiplexing) symbol, as proposed in the present disclosure.

Referring to FIG. 8, UCI may be classified into a part 1 and a part 2 and encoded by independent FEC encoding methods, and then may be mapped to REs of an OFDM symbol sequentially or at regular intervals.

Specifically, UCI a UE wants to transmit to a base station may be classified into a part 1 (first UCI) and a part 2 (second UCI) and encoded independently.

The first UCI and the second UCI may be handled as a first sequence and a second sequence through independent encoding methods (for example, FEC encoding) and modulation, in order to be mapped to REs of an OFDM symbol.

An input of RE mapping may be composed of a modulation symbol sequence (first sequence) of the first UCI and a modulation symbol sequence (second sequence) of the second UCI which are sequentially outputted through encoding and modulation.

The encoded and modulated first and second sequences may be mapped sequentially or at regular intervals to an OFDM symbol by the following method.

Embodiment 1

(a) of FIG. 8 shows an example of a method in which UCI is sequentially mapped along a frequency axis.

The above-mentioned modulated first and second sequences may be sequentially mapped to REs of an OFDM symbol on the frequency axis in the order inputted, as illustrated in (a) of FIG. 8.

Specifically, the UCI divided into a part 1 and a part 2 are encoded by independent encoding methods and sequentially outputted through a modulation procedure using a particular modulation method, thereby generating a first sequence and a second sequence which are to be mapped to REs.

The part 1 may be composed of a CSI part 1 and/or HARQ-ACK that are encoded together, and the part 2 may be composed of a CSI part 1 which is separately encoded.

In this case, the CSI part 1 has to be successfully decoded so that the size of the payload of the CSI part 2 is recognized. Due to this, the part 1 may have higher priority than the part 2.

That is, the first sequence of the part 1 may be mapped to the OFDM symbol earlier than the second sequence of the part 2, and the first sequence and the second sequence may be sequentially mapped on the frequency axis.

For example, as illustrated in (a) of FIG. 8, a U sequence (u(0), u(1), . . . ,u(N−1) composed of a first sequence and a second sequence may be sequentially mapped from the first frequency or subcarrier/RE index (k=k0) of the first OFDM symbol (l=l0).

That is, the U sequence may be mapped as the value of k is sequentially increased or decreased while the value of l is fixed to l0.

As an example in which the value of k is increased, the U sequence may be mapped in the order of {l0+1, k0+1}, {l0+1, k0+2}, . . . , starting from {l0+1, k0}.

Embodiment 1 requires no additional complexity because no additional computation or memory is required to map UCI to REs. Moreover, in a case where the UCI part 1 is constructed by encoding UCI that requires low latency (e.g., HARQ-AC and/or SR) alone or in combination with other UCI information (e.g., CSI part 1), the UCI part 1 is mapped before anything else in time, which is an advantage in terms of latency.

That is, the CSI part 1 needs to be decoded earlier than the CSI part 2, so that latency can be reduced by sequentially mapping UCI as in Embodiment 1.

Embodiment 2

(b) of FIG. 8 shows an example of a method in which UCI is mapped at regular intervals along a frequency axis.

As for the above-mentioned modulated first and second sequences, once the first sequence is mapped to REs of an OFDM symbol at regular intervals, the second sequence may be sequentially mapped on the frequency axis within the intervals at which the first sequence is mapped, as illustrated in (b) of FIG. 8.

Specifically, the first and second sequences encoded and modulated according to the method discussed in Embodiment 1 may be mapped to an OFDM symbol in such a manner that the first UCI and the second UCI are distributed as much as possible in the time domain and/or frequency domain.

That is, once N1 modulation symbols of the first sequence are mapped to REs in such a manner that they are distributed as equally as possible in the time domain and/or frequency domain of the PUCCH, the modulation symbols of the second sequence may be sequentially mapped to the remaining REs to which the modulation symbols of the first sequence are not mapped.

The first and second sequences may be mapped as illustrated in (b) of FIG. 8 according to the order listed below.

A U sequence of length N may be constructed in the following order:

u1(0), u1(1), u1(2),u1(3), . . . ,u1(N1−1), u2(0), u2(1), u2(2),u2(3), . . . ,u2(N2−1)

In order to map the first sequence of length N1, out of the U sequence of length N, in equal parts to NRE (>=) REs (available for UCI transmission), (localized) RE indexing may be performed in a frequency-first time-second manner.

In this state, the first sequence may be distributed at regular intervals (e.g., at d intervals) so that the first sequence is mapped to REs.

The intervals d at which the distributed modulation symbols of the first sequence are mapped to REs may be determined by the following Equation 3:

$$d = \text{floor}\left(\frac{NRE}{N1}\right)$$ [Equation 3]

When a sequence of length RE distributed by Equation 3 is referred to as a U' sequence, the U' sequence may be constructed in the following order when d has a value of 3:

u1(0),X,X,u1(1),X,X,u1(2) . . . .

where X may be positions reserved to fill the second sequence or the second sequence and (NRE−N) dummy values, if the second sequence is not long enough to be mapped in between the first sequence (i.e., N1+N2=N<NRE).

The dummy values may be some among '0', random values, and the modulation symbol values of the first UCI or second UCI.

The second sequence may be sequentially mapped on the frequency axis to the positions other than those where the first sequence is mapped to REs or the positions (the above X) of the REs reserved for the second sequence (or the second sequence and dummy values).

After the second sequence (or the second sequence and dummy values) is placed, the U' sequence of length NRE may be as follows:

u1(0),u2(0),u2(1),u1(1),u2(2),u2(3),u1(2) . . . .

The above U' sequence of length NRE may be sequentially mapped (frequency first mapping) on the frequency axis to NRE REs available for UCI transmission (i.e., REs to which UCI is to be mapped).

In the above method, if the length N1 of the first sequence is larger than the length N2 of the second sequence, that is, N1>N2, the second sequence may be distributed at regular intervals first and then the first sequence may be placed in the remaining positions.

In this case, d may be calculated as in the following Equation 4:

$$d = \text{floor}\left(\frac{NRE}{N2}\right)$$ [Equation 4]

If frequency hopping is applied to the PUCCH, the modulation symbols of the first UCI and the second UCI may be divided into modulation symbols corresponding to floor(N1/2) and floor(N2/2) on one frequency hop and divided into modulation symbols corresponding to ceil(N1/2) and ceil(N/2) on another frequency hop. In this state, the UCI may be mapped to an OFDM symbol on each frequency hop by using the method of Embodiment 2.

That is, in the case where frequency hopping is applied to the PUCCH, a first sequence and a second sequence are divided depending on the number of frequency hops, and each of the divided sequences may be mapped on each hop according to the method of Embodiment 2.

By mapping UCI to a symbol by this method, maximum diversity gain can be achieved in the time domain and frequency domain.

Embodiment 3

(c) of FIG. 8 shows an example of a method in which UCI is sequentially mapped along a frequency axis.

The above-mentioned modulated first and second sequences may be mapped first according to Embodiment 1 and then mapped according to Embodiment 2 in the last OFDM symbol.

Specifically, the first and second sequences encoded and modulated according to the method discussed in Embodiment 1 may be sequentially mapped along the frequency axis in the order inputted, by the frequency first mapping method. Within the same OFDM symbol, mapping may be performed by taking frequency diversity gain into consideration.

The above method is a method for making up for the lack of frequency diversity gain which occurs when the number of first UCI or second UCI modulation symbols transmitted within one OFDM symbol is small, while maintaining the suitability of Embodiment 1 for the low latency issues or sequential decoding of first UCI and second UCI.

That is, at the beginning, the first sequence and the second sequence are sequentially mapped along the frequency axis as in Embodiment 1. On the other hand, in an OFDM symbol where the first sequence and/or second sequence cannot be mapped to all REs of the OFDM symbol, the first sequence (or second sequence) may be mapped at regular intervals, and the second sequence (or first sequence) may be sequentially mapped within the regular intervals, according to Embodiment 2.

In other words, in a case where a corresponding OFDM symbol(s), among the OFDM symbols belonging to the PUCCH duration, is composed only of first UCI and second UCI and the first UCI or second UCI fills in the entire corresponding OFDM symbol(s), the frequency first mapping of Embodiment 1 is sequentially performed on the OFDM symbol(s) along the frequency axis.

Although the first UCI and the second UCI may coexist within the OFDM symbol(s), or the first UCI (or the second UCI) may exist alone within the corresponding OFDM symbol(s), if the number of first sequences (or second sequences) of the first UCI (or the second UCI) that exists alone is equal to or less than the number of REs available for UCI transmission within the corresponding OFDM symbol where RE mapping is performed, the first UCI (or the second UCI) may be distributed as much as possible in the frequency domain and mapped to REs.

Specifically, the first UCI and the second UCI may be mapped to REs of an OFDM symbol by the following method.

Assuming that, in a PUCCH consisting of a plurality of OFDM symbols, the number of REs available for UCI transmission in one OFDM symbol is NRE' (while (localized) RE indexing has been performed only on the corresponding NRE' REs on the frequency axis), the intervals d' between the modulation symbols of the first UCI mapped to the first OFDM symbol may be determined as follows.

If N1>NRE', the modulation symbols of the first UCI may be mapped to all REs of the corresponding OFDM symbol. Thus, the modulation symbols of the first UCI may be sequentially mapped for the corresponding OFDM symbol along the frequency axis according to the frequency first mapping method.

In this case, the first UCI is placed at every position (i.e., the first UCI is mapped to every RE), and therefore the intervals d' between the modulation symbols of the first UCI may be '1'.

On the other hand, if N1<=NRE', the intervals d' between the modulation symbols of the first UCI may be determined by d'=floor(NRE/N1). This means that the modulation symbols of the first UCI and the modulation symbols of the second UCI may coexist within one OFDM symbol.

Assuming that the number of first UCIs to be mapped to the corresponding OFDM symbol is N1' (N1'=N1 in the above example), and the number of second UCIs is N2', if N1>N2', N2' modulation symbols of the second UCI may be distributed and mapped first at the intervals of d'=floor(NRE/N2'), and N1' modulation symbols of the first UCI may be mapped to the positions of the remaining REs available for UCI transmission in the corresponding OFDM symbol.

On the other hand, if d' is determined by the following Equation 5 and min(N1',N2') is N1' (or N2), N1' (or N2') modulation symbols of the first UCI (or second UCI) mapped to the corresponding OFDM symbol may be placed and mapped first at d' intervals.

$$d'=\text{floor}(NRE/\min(N1',N2'))$$ [Equation 5]

Afterwards, N2' (or N1') modulation symbols of the second UCI (or first UCI) may be placed and mapped to the positions of the remaining REs available for UCI transmission in the corresponding OFDM symbol.

In the second OFDM symbol, if N1>NRE', (N1−NRE') unmapped (or remaining) modulation symbols of the first UCI may exist.

In this case, the mapping method for the first OFDM symbol explained with respect to N1 unmapped (or remaining) modulation symbols of the first UCI may be applied to (N1−NRE') unmapped (or remaining) modulation symbols of the first UCI.

If (N1−NRE')<=NRE', the intervals d' between the remaining modulation symbols of the first UCI mapped to the second OFDM symbol may be determined by the following Equation 6:

$$d'=\text{floor}(NRE'/(N1-NRE'))$$ [Equation 6]

Once the modulation symbols of the first UCI are thusly mapped in the order of OFDM symbol indices, the modulation symbols of the second UCI may be mapped to the remaining REs to which the first UCI is not mapped.

By mapping UCI using Embodiment 3, the UCI is sequentially mapped to the remaining symbols, except the last symbol, within the PUCCH duration, thereby reducing the latency of the UCI, and the UCI is mapped at regular intervals in the last symbol, thereby achieving frequency diversity gain.

Embodiment 4

The mapping methods of Embodiments 1 to 3 may also apply when an OFDM-based PUCCH is composed of two or more OFDM symbols and supports frequency hopping within the duration of the PUCCH.

That is, if frequency hopping is supported, the methods explained in Embodiments 1 to 3 may be applied individually on each hop taken in the PUCCH duration.

In this instance, the number of modulation symbols of the first UCI and second UCI mapped on each hop may be equal.

That is, a first sequence of the first UCI whose length is N1 and a second sequence of the second UCI whose length is N2 may be distributed equally for two frequency hops, in order to apply the mapping methods of Embodiments 1 to 3 for each frequency hop.

Assuming that the length of the first sequence distributed for each frequency hop is N1-1 and N1-2, N1-1 may be determined as in the following Equation 7:

$$N1\text{-}1=\text{ceiling}(N1/2), \text{ or } N1\text{-}1=\text{floor}(N1/2) \quad \text{[Equation 7]}$$

N1-2 may be determined as in the following Equation 8.

$$N1\text{-}2=N1-N1\text{-}1 \quad \text{[Equation 8]}$$

Moreover, the lengths N2-1 and N2-2 of the second sequence distributed for each frequency hop may be determined by the following Equation 9 in a similar way to the above:

$$N2\text{-}1=\text{ceiling}(N2/2), \text{ or } N2\text{-}1=\text{floor}(N2/2) \quad \text{[Equation 9]}$$

N2-2 may be determined by the following Equation 10:

$$N2\text{-}2=N2-N2\text{-}1 \quad \text{[Equation 10]}$$

After the first sequence and the second sequence are distributed equally for each frequency hop as described above, the first sequence of length N1-1 (hereinafter, the (1-1)th sequence) and the second sequence of length N2-1 (hereinafter, the (2-1)th sequence) may be mapped for the first frequency hop by the methods of Embodiments 1 to 3.

That is, in Embodiments 1 to 3, first UCI and second UCI may be mapped for the first hop by substituting the first sequence for the (1-1)th sequence and the second sequence for the (2-1)th sequence.

In the same manner, the sequences of UCI distributed equally for each frequency hop may be mapped by the methods explained in Embodiments 1 to 3.

FIG. 9 is a sequential diagram showing an example of a method of operation of a UE that performs a method proposed in the present disclosure.

Referring to FIG. 9, the UE may divide UCI into two parts and map them to OFDM symbols sequentially or at regular intervals and transmits them to a base station through a PUCCH.

Specifically, the UE may map a first sequence of first uplink control information (UCI) and a second sequence of second UCI to at least one OFDM symbol of the PUCCH (S9010).

At this point, the first sequence and the second sequence may be mapped by the above-described methods of Embodiments 1 to 3. Also, if frequency hopping is supported, the first sequence and the second sequence may be mapped by the method of Embodiment 4.

For example, in a case where a first sequence and a second sequence are mapped to OFDM symbols according to Embodiment 3, the first sequence may be sequentially mapped up to a symbol before a last symbol of the at least one OFDM symbol on a frequency axis and mapped at regular intervals of two or more resource elements (REs) in the last symbol.

Moreover, the second sequence may be sequentially mapped on the frequency axis between REs of the last symbol to which the first sequence is mapped.

Afterwards, the UE may transmit the first UCI and second UCI mapped to the OFDM symbols to a base station through the PUCCH (S9020).

Regarding this, the above-described operation of the UE may be implemented concretely by a UE device 1120, 1120 shown in FIGS. 11 and 12. For example, the above-described operation of the UE may be performed by a processor 1121, 1221 and/or an RF unit (or module) 1123 and 1225.

Specifically, the processor 1121, 1221 may control such that a first sequence of first uplink control information (UCI) and a second sequence of second UCI are mapped to at least one OFDM symbol of the PUCCH.

At this point, the first sequence and the second sequence may be mapped by the above-described methods of Embodiments 1 to 3. Also, if frequency hopping is supported, the first sequence and the second sequence may be mapped by the method of Embodiment 4.

For example, in a case where a first sequence and a second sequence are mapped to OFDM symbols according to Embodiment 3, the first sequence may be sequentially mapped up to a symbol before a last symbol of the at least one OFDM symbol on a frequency axis and mapped at regular intervals of two or more resource elements (REs) in the last symbol.

Moreover, the second sequence may be sequentially mapped on the frequency axis between REs of the last symbol to which the first sequence is mapped.

Afterwards, the processor 1121, 1221 may control such that the first UCI and second UCI mapped to the OFDM symbols are transmitted to the base station through the RF unit (or module) 1123 and 1225 over the PUCCH.

FIG. 10 is a sequential diagram showing an example of a method of operation of a base station that performs a method proposed in the present disclosure.

Referring to FIG. 10, the base station may receive UCI, which is divided into two parts and mapped to OFDM symbols sequentially or at regular intervals, from a UE through a PUCCH.

Specifically, the base station may receive first uplink control information (UCI) and second UCI from a UE through the PUCCH (S10010).

At this point, a first sequence of the first UCI and a second sequence of the second UCI may be mapped by the above-described methods of Embodiments 1 to 3.

Also, if frequency hopping is supported, the first sequence and the second sequence may be mapped by the method of Embodiment 4.

For example, the first sequence of the first UCI and the second sequence of the second UCI may be mapped to at least one OFDM symbol of the PUCCH.

In this case, the first sequence may be sequentially mapped up to a symbol before a last symbol of the at least one OFDM symbol on a frequency axis and mapped at regular intervals of two or more REs in the last symbol.

Moreover, the second sequence may be sequentially mapped on the frequency axis between REs of the last symbol to which the first sequence is mapped.

Regarding this, the above-described operation of the base station may be implemented concretely by a base station device 1110, 1210 shown in FIGS. 11 and 12. For example, the above-described operation of the base station may be performed by a processor 1111, 1211 and/or an RF unit (or module) 1113, 1215.

Specifically, the processor 1111, 1211 may control such that the first UCI and the second UCI are received from the UE through the RF unit (or module) 1113, 1215 over the PUCCH.

At this point, the first sequence and second sequence of the first UCI may be mapped by the above-described methods of Embodiments 1 to 3. Also, if frequency hopping is supported, the first sequence and the second sequence may be mapped by the method of Embodiment 4.

For example, the first sequence of the first UCI and the second sequence of the second UCI may be mapped to at least one OFDM symbol of the PUCCH.

In this case, the first sequence may be sequentially mapped up to a symbol before a last symbol of the at least one OFDM symbol on a frequency axis and mapped at regular intervals of two or more resource elements (REs) in the last symbol.

Moreover, the second sequence may be sequentially mapped on the frequency axis between REs of the last symbol to which the first sequence is mapped.

General Apparatus to which the Present Disclosure May be Applied

FIG. 11 illustrates a block diagram of a wireless communication apparatus to which methods proposed in the present disclosure may be applied.

Referring to FIG. 11, a wireless communication system includes a BS 1110 and multiple UEs 1120 located within a BS area.

The BS and the UE may be represented as respective wireless apparatuses.

The BS 1110 includes a processor 1111, a memory 1112 and a radio frequency (RF) module 1113. The processor 1111 implements the functions, processes and/or methods proposed with reference to FIGS. 1 to 10 and embodiment 1 to 4. The layers of a radio interface protocol may be implemented by the processor. The memory is coupled to the processor and stores various pieces of information for driving the processor. The RF module is coupled to the processor and transmits and/or receives radio signals.

The UE includes a processor 1121, a memory 1122 and an RF module 1123.

The processor implements the functions, processes and/or methods proposed with reference to FIGS. 1 to 10 and embodiment 1 to 4. The layers of a radio interface protocol may be implemented by the processor. The memory is coupled to the processor and stores various pieces of information for driving the processor. The RF module 1123 is coupled to the processor and transmits and/or receives radio signals.

The memory 1112, 1122 may be inside or outside the processor 1111, 1121 and may be coupled to the processor by various well-known means.

Furthermore, the BS and/or the UE may have a single antenna or multiple antennas.

FIG. 12 is another example of a block diagram of the wireless communication apparatus to which methods proposed in the present disclosure may be applied.

Referring to FIG. 12, a wireless communication system includes a BS 1210 and multiple UEs 1220 disposed within the BS region. The BS may be represented as a transmission device, and the UE may be represented as a reception device, and vice versa. The BS and the UE include processors 1211 and 1221, memories 1214 and 1224, one or more Tx/Rx radio frequency (RF) modules 1215 and 1225, Tx processors 1212 and 1222, Rx processors 1213 and 1223, and antennas 1216 and 1226, respectively. The processor implements the above-described functions, processes and/or methods. More specifically, in DL (communication from the BS to the UE), a higher layer packet from a core network is provided to the processor 1211. The processor implements the function of the L2 layer. In DL, the processor provides the UE 1220 with multiplexing between a logical channel and a transport channel and radio resource allocation, and is responsible for signaling toward the UE. The TX processor 1212 implements various signal processing functions for the L1 layer (i.e., physical layer). The signal processing function facilitates forward error correction (FEC) in the UE, and includes coding and interleaving. A coded and modulated symbol is split into parallel streams. Each stream is mapped to an OFDM subcarrier and multiplexed with a reference signal (RS) in the time and/or frequency domain. The streams are combined using inverse fast Fourier transform (IFFT) to generate a physical channel that carries a time domain OFDMA symbol stream. The OFDM stream is spatially precoded in order to generate multiple space streams. Each of the space streams may be provided to a different antenna 1216 through an individual Tx/Rx module (or transmitter and receiver 1215). Each Tx/Rx module may modulate an RF carrier into each space stream for transmission. In the UE, each Tx/Rx module (or transmitter and receiver 1225) receives a signal through each antenna 1226 of each Tx/Rx module. Each Tx/Rx module restores information modulated in an RF carrier and provides it to the RX processor 1223. The RX processor implements various signal processing functions of the layer 1. The RX processor may perform space processing on information in order to restore a given space stream toward the UE. If multiple space streams are directed toward the UE, they may be combined into a single OFDMA symbol stream by multiple RX processors. The RX processor converts the OFDMA symbol stream from the time domain to the frequency domain using fast Fourier transform (FFT). The frequency domain signal includes an individual OFDMA symbol stream for each subcarrier of an OFDM signal. Symbols on each subcarrier and a reference signal are restored and demodulated by determining signal deployment points having the best possibility, which have been transmitted by the BS. Such soft decisions may be based on channel estimation values. The soft decisions are decoded and deinterleaved in order to restore data and a control signal originally transmitted by the BS on a physical channel. A corresponding data and control signal are provided to the processor 1221.

UL (communication from the UE to the BS) is processed by the BS 1210 in a manner similar to that described in relation to the receiver function in the UE 1220. Each Tx/Rx module 1225 receives a signal through each antenna 1226. Each Tx/Rx module provides an RF carrier and information to the RX processor 1223. The processor 1221 may be related to the memory 1224 storing a program code and data. The memory may be referred to as a computer-readable medium.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present disclosure has been basically described based on an example in which the present disclosure is applied to the 3GPP LTE/LTE-A/NR systems, but may be applied to various wireless communication systems in addition to the 3GPP LTE/LTE-A/NR system.

The invention claimed is:

1. A method for a UE to transmit a physical uplink control channel (PUCCH) in a wireless communication system, the method comprising:
    mapping a first sequence of first uplink control information (UCI) and a second sequence of second UCI to at least one OFDM symbol of the PUCCH; and
    transmitting the first UCI and the second UCI to a base station through the PUCCH,
    wherein the first sequence is sequentially mapped up to a symbol before a last symbol of the at least one OFDM symbol on a frequency axis and mapped at regular intervals of two or more REs (resource elements) in the last symbol, and
    the second sequence is sequentially mapped on the frequency axis between REs of the last symbol to which the first sequence is mapped.

2. The method of claim 1, wherein a length of the first sequence is larger than the number of REs of one OFDM symbol,
    wherein the length of the first sequence mapped to the last symbol is equal to or smaller than half the number of REs of the last OFDM symbol.

3. The method of claim 1, wherein the length of the first sequence is larger than a length of the second sequence, and the length of the second sequence is equal to or smaller than half the number of REs of the last OFDM symbol.

4. The method of claim 1, wherein the first UCI and the second UCI are encoded by independent encoding methods.

5. The method of claim 1, wherein the first UCI is constructed by joint encoding and modulating of at least one among HARQ-ACK, SR (scheduling request), and/or CSI (channel state information) part 1, and the second UCI is constructed by individually encoding and demodulating CSI part 2.

6. The method of claim 1, wherein the PUCCH over which the first UCI and the second UCI are mapped and transmitted is a large payload short PUCCH consisting of 1 symbol or 2 symbols.

7. The method of claim 1, wherein, when the PUCCH is transmitted through frequency hopping, the first UCI and the second UCI are split into as many parts as the number of frequency hops the PUCCH takes and mapped on each of the frequency hops.

8. A method for a base station to receive a physical uplink control channel (PUCCH) in a wireless communication system, the method comprising receiving first UCI (uplink control information) and second UCI from a UE through the PUCCH,
    wherein a first sequence of the first UCI and a second sequence of the second UCI are mapped to at least one OFDM symbol of the PUCCH,
    wherein the first sequence is sequentially mapped up to a symbol before a last symbol of the at least one OFDM symbol on a frequency axis and mapped at regular intervals of two or more REs (resource elements) in the last symbol, and
    the second sequence is sequentially mapped on the frequency axis between REs of the last symbol to which the first sequence is mapped.

9. A UE for transmitting a physical uplink control channel (PUCCH) in a wireless communication system, the UE comprising:
    an RF (radio frequency) module for transmitting and receiving a radio signal; and
    a processor functionally connected to the RF module,
    wherein the processor maps a first sequence of first uplink control information (UCI) and a second sequence of second UCI to at least one OFDM symbol of the PUCCH and transmits the first UCI and the second UCI to a base station through the PUCCH,
    wherein the first sequence is sequentially mapped up to a symbol before a last symbol of the at least one OFDM symbol on a frequency axis and mapped at regular intervals of two or more REs (resource elements) in the last symbol, and
    the second sequence is sequentially mapped on the frequency axis between REs of the last symbol to which the first sequence is mapped.

* * * * *